United States Patent
Aigner et al.

(10) Patent No.: US 7,596,442 B2
(45) Date of Patent: Sep. 29, 2009

(54) CONTROL UNIT FOR CONTROLLING THE ELECTRIC CURRENT OF A SOLENOID CONTROL VALVE IN A MANNER THAT IS ROBUST WITH RESPECT TO THE VOLTAGE RIPPLE OF A VEHICLE ELECTRICAL SYSTEM AND ASSOCIATED METHOD

(75) Inventors: Christian Aigner, Vilsbiburg (DE); Oliver Lehner, Beratzhausen (DE); Mike Vogel, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 12/295,020

(22) PCT Filed: Feb. 14, 2007

(86) PCT No.: PCT/EP2007/051446

§ 371 (c)(1),
(2), (4) Date: Dec. 12, 2008

(87) PCT Pub. No.: WO2007/110273

PCT Pub. Date: Oct. 4, 2007

(65) Prior Publication Data

US 2009/0138130 A1    May 28, 2009

(30) Foreign Application Priority Data

Mar. 28, 2006   (DE) .................. 10 2006 014 352

(51) Int. Cl.
    *B62B 6/00* (2006.01)
(52) U.S. Cl. .................. 701/42; 701/36; 701/78
(58) Field of Classification Search ............... 701/1, 701/36, 41, 42, 22, 34, 29, 31, 70, 78, 83, 701/43
    See application file for complete search history.

(56) References Cited

U.S. PATENT DOCUMENTS

| 4,355,274 | A  | * | 10/1982 | Bourbeau ............... 318/812 |
| 7,053,719 | B2 | * | 5/2006  | Steinbach et al. ........ 331/16 |
| 7,209,009 | B2 | * | 4/2007  | Steinbach et al. ........ 331/16 |

* cited by examiner

*Primary Examiner*—Richard M. Camby
(74) *Attorney, Agent, or Firm*—Laurence A. Greenberg; Werner H. Stemer; Ralph E. Locher

(57) ABSTRACT

In a motor vehicle control unit having a digital control circuit for controlling the electric current, in a way which is robust with respect to the voltage ripple of a vehicle on-board power system, of a control magnet valve for a motor vehicle hydraulic device with simultaneously improved dynamic behavior in response to jumps in a setpoint value current as a reference variable of the control circuit, at least one adaptive correction filter whose filter time can be adjusted dynamically on the basis of the change in level of the setpoint value current is provided in the feedback branch of the digital control circuit.

15 Claims, 2 Drawing Sheets

CONTROL UNIT FOR CONTROLLING THE ELECTRIC CURRENT OF A SOLENOID CONTROL VALVE IN A MANNER THAT IS ROBUST WITH RESPECT TO THE VOLTAGE RIPPLE OF A VEHICLE ELECTRICAL SYSTEM AND ASSOCIATED METHOD

BACKGROUND OF THE INVENTION

Field of the Invention

The invention relates to a motor vehicle control unit having a digital closed loop system for controlling the electric current of a solenoid control valve for a motor vehicle hydraulic device in a manner that is robust with respect to the voltage ripple of a vehicle electrical system with simultaneously improved dynamic behavior in response to jumps in the setpoint value current as a reference variable of the closed loop system.

In automatic transmissions in motor vehicles, for example, various clutches and/or brakes are actuated hydraulically as hydraulic devices for the purpose of selecting a gear as well as for implementing gear shifts. In particular, hydraulically actuated clutches and/or brakes are used in motor vehicles for the purpose of coupling or securing shafts. The hydraulic actuation takes place in this case in such a way that the flow rate and hence the hydraulic pressure of the hydraulic medium in said clutches and brakes is set by means of what are termed solenoid control valves with associated digital closed loop systems. The flow rate of the respective solenoid control valve is dependent on the electric coil current flowing through the valve and is adjusted by means of a current controller. Toward that end a measuring element or sensor is provided in the feedback branch of the respective closed loop system for the purpose of determining the actual current through the solenoid control valve and supplying it to the input of the digital controller, more particular a PID controller. Owing to the already known set of characteristic curves of the solenoid control valve it is possible to deduce the hydraulic pressure of the hydraulic medium from the measured electric current through the solenoid control valve.

In practice the vehicle electrical system voltage or supply voltage of the respective motor vehicle can be unstable. In particular it can fluctuate even up to as much as several volts due to the influence of a variety of factors. Said fluctuations in the vehicle electrical system supply voltage can also be transmitted to the electric current flowing through the respective solenoid control valve, with the result that the control variable of its closed loop system is subject to interferences. In particular if the interferences are periodic it can lead in the case of unfavorable frequencies of the interferences (resonance frequencies) to an undesirable oscillation or even surging of the actual current, i.e. of the output-side control variable of the current controller of the closed loop system. This could be counteracted by a slow filter, i.e. a filter with a long filter time, in the feedback branch of the digital closed loop system. However, this would result in the digital controller itself also becoming more inert or slower. A slow response on the part of the controller is undesirable in practice, however, since in automatic transmissions, for example, a fast response by the controller is required in particular during shifting operations that are associated with a setpoint value current profile characterized by sudden jumps.

BRIEF SUMMARY OF THE INVENTION

The object underlying the invention is, in the interest of improved setting of the electric current of a solenoid control valve for a motor vehicle hydraulic device, to provide a motor vehicle control unit having a digital or discrete closed loop system which is largely robust with respect to vehicle electrical system voltage ripple and at the same time has a sufficiently high dynamic behavior to allow rapid correction of intended jumps in the setpoint value current profile of the solenoid control valve.

This object is achieved in the case of a motor vehicle control unit of the type cited in the introduction in that there is provided in the feedback branch of the digital closed loop system at least one adaptive correction filter whose filter time is dynamically adjustable based on the level change of the setpoint value current.

Because the filter time of the at least one filter in the feedback branch of the digital or discrete closed loop system for the solenoid control valve is switchable as a function of the level dynamics or level change of the desired setpoint value current for the solenoid control valve, the closed loop system can, on the one hand, respond highly dynamically, i.e. with a rapid correction response, to a desired jump in the setpoint value current. On the other hand, in the static state, i.e. with minor level changes in the setpoint value current, it remains largely stable or robust in respect of vehicle electrical system voltage ripple.

The control unit according to the invention is suitable in particular as a transmission controller for automatic transmissions with high ease-of-use requirements in terms of the speed of execution of desired shifting operations and at the same with high demands with regard to insensitivity to high vehicle electrical system variations.

The invention also relates to a method for reducing the effect of vehicle electrical system voltage ripple on the control of the electric current of a solenoid control valve in the digital closed loop system of a control unit for a motor vehicle hydraulic device with at the same time improved dynamic behavior in response to jumps in the setpoint value current as a reference variable of the closed loop system, which method is characterized in that the filter time of at least one adaptive correction filter in the feedback branch of the digital closed loop system is set dynamically based on the level change of the setpoint value current.

Other developments of the invention are set forth in the dependent claims.

The invention and its developments are explained in more detail below with reference to drawings, in which:

DESCRIPTION OF THE INVENTION

Figure 1:
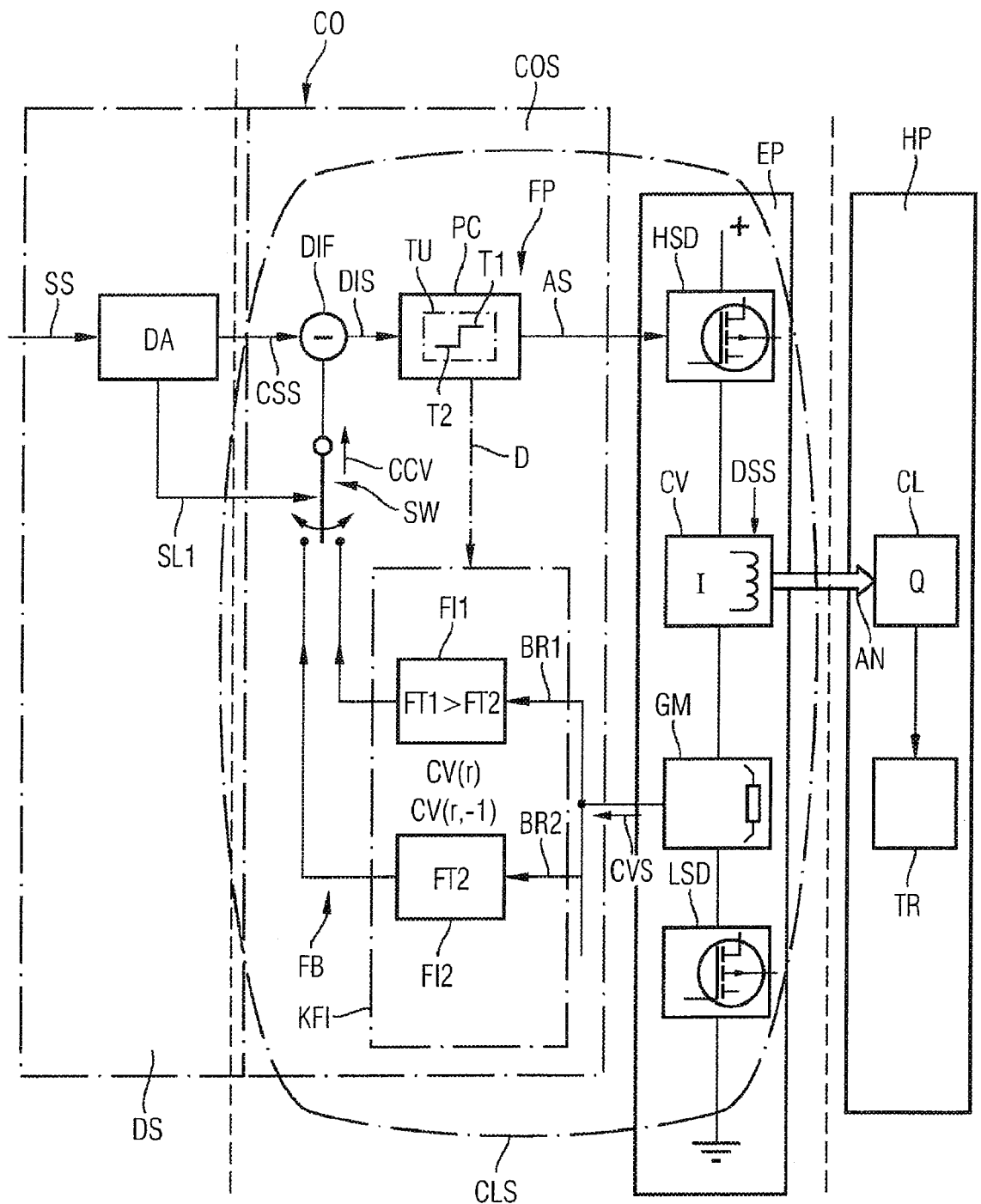
FIG. 1 shows in schematic representation a transmission controller as an exemplary embodiment of an inventive motor vehicle control unit having a digital closed loop system for setting the electric coil current of the solenoid control valve of a motor vehicle hydraulic device.
Figure 2:
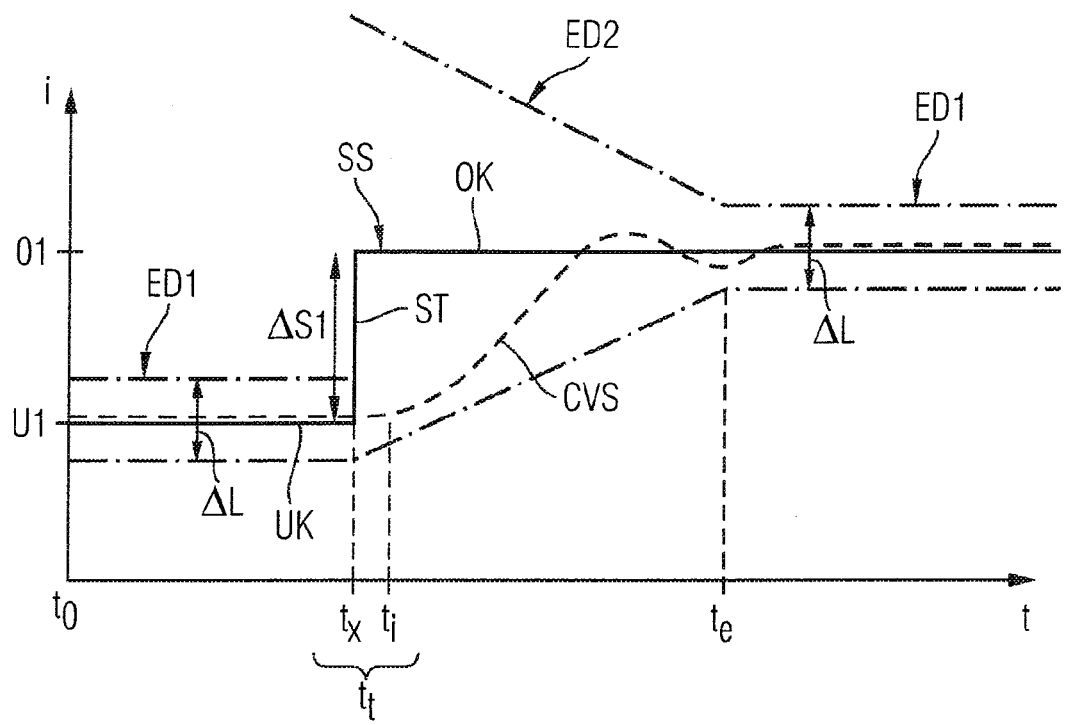
FIG. 2 shows with reference to an exemplary current diagram the control conditions in the digital closed loop system of the transmission controller of FIG. 1 when a fast and a slow correction filter are switched dynamically in its feedback branch as a function of the level change of the setpoint value current for the solenoid control valve.
Figure 3:
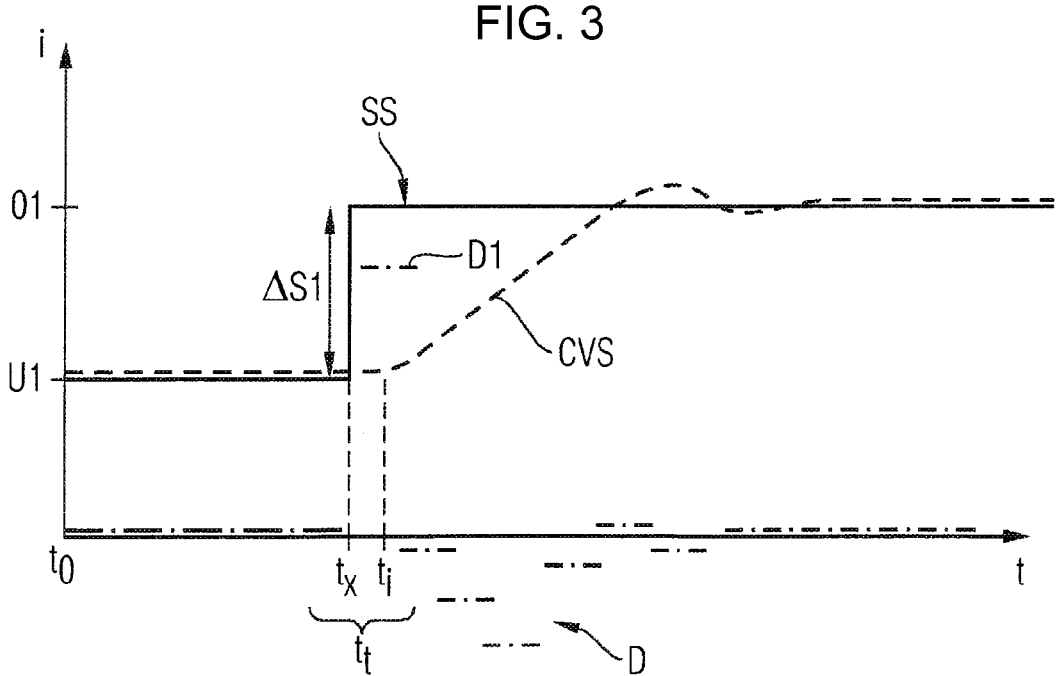
FIG. 3 shows with reference to a further exemplary current diagram the control conditions in the digital closed loop system of the transmission controller of FIG. 1 when a correction filter is switched in its feedback branch as a function of the D component of the output actuating variable of the digital controller in the closed loop system.

Elements having the same function and mode of operation are labeled by the same reference signs in each case in FIGS. 1 to 3.

FIG. 1 shows by way of example, in a schematic representation, a transmission controller CO as control unit, which is used to set the volume flow Q of a hydraulic medium, in particular a hydraulic fluid such as e.g. hydraulic oil, in a motor vehicle hydraulic device HP by means of an electric final control element or actuator EP. The transmission controller CO is preferably embodied as an automatic transmission control unit for an automatic transmission. The electric final control element or actuator EP has as its main component a solenoid control valve CV between its high-potential driver stage HSD and its low-potential driver stage LSD. Setting the coil current I of the solenoid control valve CV causes its armature AN to plunge in a centering actuator to different depths into the volume flow Q of the hydraulic device HP. For the sake of simplifying the drawing the armature AN is indicated in FIG. 1 simply by an arrow. In practice the hydraulic device HP is formed by means of at least one clutch CL and/or by means of at least one hydraulic brake. The clutch CL or the hydraulic brake is in active engagement with a transmission TR of the motor vehicle. The coil current I of the solenoid control valve CV is assigned a specific hydraulic pressure of the volume flow Q in the hydraulic device HP via its set of characteristic curves.

In order to adjust the coil current I of the solenoid control valve CV with maximum precision and speed to a specific setpoint current time profile, i.e. expressed in equivalent terms, to generate a desired pressure time profile of the volume flow Q in the hydraulic device HP corresponding to the coil current I, the transmission controller CO has a dynamic digital controller PC, in particular a PID controller, in the forward branch FP of its digital closed loop system CLS. The controller CV outputs an actuating variable signal AS via the high-potential driver stage HSD to the solenoid control valve CV for the hydraulic device HP. In this case the solenoid control valve CV and the hydraulic device HP form part of the control path of the closed loop system CLS. A further component of the control path is a measuring element or sensor GM for measuring the actual current CVS of the solenoid control valve CV. Said measuring element sits in the input-side subsection of the feedback branch FB of the digital closed loop system CLS and is attached to the low-potential driver stage LSD. Here in the exemplary embodiment, the measuring element GM is formed by means of a galvanometer which determines the voltage present at a given time at the solenoid control valve CV via a specific electric resistance as a metric for the actual current CVS of the solenoid control valve CV. It converts the measured voltage values following corresponding A/D conversion into associated discrete actual current values CVS with the aid of Ohm's law. If necessary, the voltage supply for the solenoid control valve can also be implemented using inverted potentials.

The measured discrete actual current values CVS are then forwarded by the measuring element GM to an adaptive correction filter KFI which is disposed in the feedback branch FB and whose filter time can be set dynamically. The correction filter KFI is symbolized in FIG. 1 by a dash-dotted border. It is formed by a first, slower filter FI1 having a longer static filter time FT1 and a second, faster filter FI2 having a shorter static filter time FT2. It therefore holds that FT1>FT2. In this case the first filter FI1 sits in the feedback direction (viewed from the closed loop system output to the closed loop system input) in a first branch BR1 of the feedback path FB. In parallel therewith, the second filter FI2 is disposed in a second branch BR2 of the feedback path FB.

The filter time FT1 or FT2 of the respective filter such as e.g. FI1 or FI2 is preferably represented by the attack time of its jump response. It is in particular that period of time in which the jump response of the respective filter rises from 0 dB to a constant value K dB. It characterizes that period of time of the respective filter that the latter requires to respond to a level jump of an input signal with a corresponding level jump at the output. The greater the cutoff frequency of the respective filter, the shorter is its attack time. Expressed in general terms, the edge slope of the jump response of the respective filter is all the less steep, the greater the number of delay elements in the filter structure of the respective filter. This is associated with a greater attack time. The smaller the number of delay elements in the discrete filter structure, the steeper are the edges of the jump response of the respective digital correction filter and the shorter is its attack time duration. A filter with a short attack time can respond faster to an input-side level jump and follow the latter than a filter with a longer attack time.

If the respective filter is embodied for example as an averager, its attack time duration is determined by the order of its transmission function in the frequency range and hence by the length of its discrete pulse response. Expressed in other words, this means that a discrete filter that performs discrete averaging over a window of predefined width n T for pending input signals with the clock period T responds all the more slowly, the greater the number n of discrete input signal values that are drawn upon for averaging and overall yield a corrected discrete output value at the output of the filter. Conversely, an averaging filter of said kind has a filter time that is all the shorter, the smaller the number of discrete input values that are used for the averaging and overall generate an averaged output value. This is associated with a short attack time of the filter, with the result that said filter can follow an input-side level jump faster.

Instead of averagers for the different filters, PT1 or PT2 elements, i.e. $1^{st}$- or $2^{nd}$-order delay elements, can advantageously be used for these as simple low-pass filters. Other low-pass filters may also be beneficial.

Here in the exemplary embodiment, in particular the slower filter FI1 acts as a smoothing filter for the control variable CVS which largely filters out interferences due to vehicle electrical system voltage ripple and largely prevents these from being forwarded to the subtracting element DIF.

With the aid of a switchover element SW in the feedback branch FB which is disposed downstream of the adaptive correction filter KFI, either the branch BR1 of the first filter FI1 or the branch BR2 of the second filter FI2 is now inserted into the feedback branch FB and is effective there for the measured actual current values CVS which act as a control variable of the closed loop system CLS. The switchover element SW is in this case actuated by means of an analysis/control unit DA. For this purpose the analysis/control unit DA evaluates the discrete setpoint value current values SS of the closed loop system CLS which are supplied to its forward branch FP on the input side in terms of their level dynamics. The actuation of the switchover device SW by the analysis/control unit DA is indicated in FIG. 1 by means of a control arrow or active arrow SL1.

If the analysis/control unit DA recognizes for example that the setpoint value current SS is running approximately constantly, i.e. has a quasi-static profile, it couples the branch BR with the slow, first filter FI1 into the feedback branch FB by means of the switchover element SW. Since said first filter FI1 having a longer filter time FT1 responds slowly, it is largely insensitive and therefore robust toward interferences of the control variable CVS that are caused by vehicle electrical system voltage ripple or fluctuations. These are largely averaged out on account of its long filter time and the greater number of measured discrete actual current values which are taken into account in the floating averaging. In this way the first filter FI1 provides at its output a corrected control variable CCV from which interferences caused by vehicle electrical system voltage fluctuations have largely been eliminated.

If, on the other hand, the analysis/control unit DA establishes that the setpoint value current SS temporarily has high level dynamics, then it switches off the branch BR1 of the first filter FI1 in the feedback branch FB by means of the switchover element SW and in its place inserts the branch BR2 of the second filter FI2 with the shorter filter time FT2 into the feedback branch FB. Owing to its shorter attack time the filter FI2 permits the control variable CVS to follow jump changes in the measured actual current CVS more quickly. This is because a level jump of the setpoint value current SS leads of course to a greater control deviation DIS which the controller PC converts into a level jump of the actuating variable AS. This leads to a sudden jump increase in the electric coil current I of the solenoid control valve CV, which in turn causes a jump in the measured actual current CVS. The rapidly responding correction filter FI2 thus enables the controller PC to convert a desired level jump of the setpoint value current SS into a corresponding level jump of the actual current I in the solenoid control valve CV. In this case the overall closed loop system CLS is highly dynamic, i.e. has a rapid response behavior to desired changes in the setpoint value current profile SS.

FIG. 2 illustrates with reference to a current diagram how the dynamic switchover between the two filters FI1, FI2 with their different filter times FT1, FT2 takes place as a function of level changes in the input-side setpoint value current SS. The time t is plotted along the abscissa of the current diagram, and current values i are plotted along its ordinate. The variation with time of the setpoint value current SS is characterized with the aid of an unbroken line. It initially runs in the period from $t_0$ time $t_x$ essentially at the constant value U1. At time $t_x$ it jumps by a current change value $\Delta$S1 to a new, higher level value 01 and retains this for a predefinable period of time. The essentially constant profile on the level of the lower setpoint current value U1 between the time $t_0$ the time $t_x$ is designated in FIG. 2 by UK, while the essentially constant current profile on the higher level 01 after the time $t_x$ is designated there by OK. The jump point between the lower constant setpoint current profile UK and the upper setpoint current profile OK is labeled with the reference sign ST in FIG. 2. The analysis/control unit DA upstream of the subtracter DIF at the input of the closed loop system CLS observes the level behavior of the setpoint value current SS in accordance with the control timing of the closed loop system CLS. As long as the analysis/control unit DA establishes that level changes of the setpoint value current SS lie below a predefinable threshold value $\Delta$L, it controls the switcher SW in the feedback branch FB in such a way that the slower correction filter FI1 with the longer filter time FT1 is switched to active. Then interferences on the control variable CVS that are caused by fluctuations in the vehicle electrical system voltage can be filtered out, in particular averaged out, such that control errors of the digital controller PC are largely avoided. The interferences to which the electric coil current I of the solenoid control valve CV is exposed due to fluctuations in the vehicle electrical system voltages are indicated in FIG. 1 by means of an interference arrow DSS. In this case, in the exemplary embodiment of FIG. 2, the slower filter FI1 is activated during the essentially constant level profile UK in the feedback branch FB. In FIG. 2 the upper and lower level fluctuation limits by which the setpoint current value U1 may vary in the case of a predefined threshold value $\Delta$L in order to be evaluated as essentially stationary or static by the analysis/control unit DA are drawn as dash-dotted lines and labeled with the reference sign ED1. As soon as the analysis/control unit DA detects that the setpoint current SS changes by more than the threshold value $\Delta$L, as in this case at the time $t_x$, it switches off the branch BR1 with the slower filter FI1 in the feedback branch FB with the aid of the switchover element SW and in its place switches on the branch BR2 with the faster correction filter FI2 there. If it comes to the setpoint value change $\Delta$S1 of the setpoint value current SS, this is reflected in a corresponding change in the control variable CVS. The level change of the control variable CVS is now essentially allowed through by the faster filter FI2 and consequently reaches the subtracting element DIF. There is thereupon a stronger change in the control deviation DIS, such that the digital controller PC can correct to the desired higher setpoint current value 01 immediately following a dead time tt. The variation with time of the measured actual current CVS that is set in the solenoid control valve CV is drawn in addition in FIG. 2 by means of a dashed line. The closed loop system CLS adjusts after a slight overshooting within the time $t_e$-$t_x$ to the new desired setpoint current value 01. From the time $t_e$ the current level of the actual current CVS scarcely changes any further and runs essentially stably with the desired setpoint value current profile OK. In the analysis/control unit DA, from the time $t_x$, at which the level changes of the setpoint value current SS exceed the predefined threshold value $\Delta$L, a timer is started which specifies a period of time for correcting the actual current CVS to the desired new setpoint current value 01. In the analysis/control unit DA, band limits ED2 tapering in a funnel shape are specified for the changes of the setpoint value current SS from the time $t_x$ of the current jump $\Delta$S1 to the correction time $t_e$. While the setpoint value current SS moves within said funnel-shaped band limits ED2, the faster filter FI2 remains activated.

From the time $t_e$, as of which the closed loop system CLS is corrected to the new setpoint value 01, it is analyzed by the analysis/control unit DA whether the predefined threshold value $\Delta$L is being undershot by the level dynamics of the setpoint value current SS. This is the case here in the exemplary embodiment from the time $t_e$. The analysis/control unit DA thereupon reactivates the slow filter FI1 with the longer filter time FT1 by means of the switchover element SW. In this way, starting from the static behavior of the closed loop system, interferences of the control variable CVS that are caused by fluctuations in the vehicle electrical system voltage can in turn be filtered out by the correction filter FI1 such that the control behavior of the closed loop system CLS remains largely unaffected by said interferences. Thus, undesirable and unnecessary regulating measures due to interferences of said kind are largely avoided. The closed loop system CLS therefore sets the actual current I in the solenoid control valve stably to the desired setpoint value current SS.

It can possibly also be beneficial to provide more than two filters of different speeds with a plurality of assigned threshold values as a filter bank. Said plurality of correction filters are preferably arranged parallel to one another in the feedback branch FB and are then activated in each case with the aid of a multiple switcher if their respective threshold value is exceeded by the detected level change of the setpoint value current.

Alternatively it may also be beneficial to provide, instead of two separate, static filters FI1, FI2, just one single correction filter in the feedback branch FD whose filter time is dynamically variable, in particular incrementally tunable, as a function of changes in the setpoint value current SS. In particular what is termed the D component of the actuating variable AS of the digital controller PC can be used as a control parameter for the filter time of the single correction filter KFI. This is indicated in FIG. 1 by means of a dash-dotted arrow D between the controller PC and the adaptive correction filter KFI. The D component D of the actuating variable signal AS e.g. of a PID controller is preferably determined according to the following relation:

$$D \text{ component } D = C_D(e_{new} - e_{old})/\Delta t,$$

where $C_D$ is a coefficient, $e_{new}$ is the control deviation in the current control cycle r, $e_{old}$ is the control deviation in the previous control cycle r−1, and $\Delta t$ is the time period between previous and current control cycle. It is beneficial in this case in particular to set upper and lower limits for the determined D component D. Indicated by means of a dash-dotted line in the controller PC in FIG. 1 is a limiter TU which limits the D component D to a lower and/or upper threshold T2, T1. In this way an upper and lower bound are specified for the filter time of the adaptive correction filter, i.e. the filter time can be variably set between the upper and lower bound.

A limited D component FD is preferably determined according to the relation $$F_D = (\min(10 \text{ mA/msec}, \max(50 \text{ mA/ms}, |D|)) \frac{\text{ms}}{50 \text{ mA}}.$$

A scaling or normalization of the limited D component $F_D$ to values between 0 and 1 is performed by means of the last factor $$\frac{\text{ms}}{50 \text{ mA}}.$$

With the aid of the actual current values CVS from the previous control cycle r−1 and the current control cycle r, the correction filter KFI now determines from said D component FD a corrected control variable CCV: CCV=$F_D$ CVS(r)+(1−FD) CVS(r−1), where r is a consecutive natural number.

The smaller the differential component in the form of the modified D component $F_D$ of the actuating variable signal AS, the greater the previous actual current value from the last control cycle r−1 is weighted. The greater the differential component $F_D$, the more heavily the actual current value CVS(r) of the current control cycle r is weighted and the less the previous actual current value CVS(r−1) from the previous control cycle r−1 is taken into account. It is of course also possible to take more than two control cycles into consideration when determining the D component D or the limited D component FD for generating the corrected control variable CCV.

FIG. 3 illustrates how, in the case of the same setpoint value current profile SS as in FIG. 2, the filter time of the single adaptive correction filter KFI is changed dynamically with the aid of the D component of the actuating variable signal AS of the controller PC. The variation with time of changes to the D component D of the actuating variable signal AS is indicated in FIG. 3 by a dash-dotted line.

Considered in summary, therefore, at least one correction filter in the feedback branch is dynamically settable in terms of its filter time. During the desired switchings of or changes to the setpoint value current a shorter filter time is chosen in order to fulfill the requirements in terms of the dynamic response of the controller. In the static state, i.e. as long as the setpoint value current varies within narrowly predefined limits or does not change at all, a correspondingly large filter time of the at least one correction filter is chosen in order to filter out as far as possible from the control variable the effect of interferences caused by fluctuations in the vehicle electrical system voltage.

In particular in the case of the embodiment variant according to FIGS. 1 and 2 it can be beneficial to implement the current controller PC in the forward path of the closed loop system CLS such that the current controller PC changes the pulse duty factor of a PWM (pulse-width-modulated) signal as the actuating variable AS. The latter for its part chops the supply voltage of the solenoid control valve CV via the output stage driver HSD (see FIG. 1) and by this means controls the current I through the solenoid control valve CV. The current I is measured by way of a measuring resistor of the measuring sensor GM and led back as the actual current, i.e. as the control variable CVS, via the feedback branch FB to the subtracter DIF at the input of the forward path FP of the closed loop system CLS. There, the difference between the setpoint current SS and the actual current CVS is determined as the control deviation DIS. The control deviation DIS is passed as an input variable to the digital controller PC, in particular a PID controller. In this case the PWM signal of the actuating variable AS preferably has a constant frequency. If the total of the setpoint current changes within a time t, which in particular corresponds to the typical adjustment time of the closed loop system, in this case in particular in approx. 30 ms, changes by less than the threshold value $\Delta L$, the measured actual current CVS is filtered using a slower or more inert filter such as e.g. FI1 in FIG. 1. In practice the threshold value $\Delta L$ can beneficially be chosen to be equal to approx. 25 mA. In this case, in the exemplary embodiment shown in FIG. 1 and FIG. 2, the slow filter FI1 preferably forms a floating average value over 6 PWM periods. If the setpoint current has changed within the time t by more than the predefined threshold value $\Delta L$, the faster filter FI2 is activated in order to be able to effect a great dynamic response of the controller. Here, in the exemplary embodiment of FIG. 1 and FIG. 2, the faster filter simply forms e.g. the average value over a single PWM period.

It can also be advantageous to choose a plurality of threshold values assigned to a plurality of fast filters instead of the threshold value of a single fast filter.

Furthermore, according to the embodiment variant of FIG. 3 it can also be beneficial in particular to provide only a single adaptive correction filter whose filter time is set dynamically, i.e. varied, by means of a function based on setpoint value changes of the setpoint value current.

By means of this dynamic setting of the filter time of one or more correction filters it is advantageous that in the event of setpoint value jumps of the setpoint value current a fast jump response of the closed loop system is generated and at the same time in the case of a stable behavior of the setpoint value current any interferences due to vehicle electrical system ripple can be filtered out by switching over to at least one filter having a slow filter response. The closed loop system then behaves essentially stably and therefore comparably to the behavior with a permanently inert, i.e. stationary, filter in its feedback branch. High-frequency parasitic oscillations that are superimposed on the control variable signal are therefore largely suppressed and are no longer included in the determination of the control deviation.

The invention claimed is:

1. A motor vehicle control unit, comprising:
    a digital closed loop system for controlling an electric current of a solenoid control valve for a motor vehicle hydraulic device in a manner that is robust with respect to a vehicle electrical system voltage ripple with simultaneously improved dynamic behavior in response to jumps in a setpoint value current as a reference variable of said digital closed loop system, said digital closed loop system having a feedback branch; and
    at least one adaptive correction filter having a filter time being set dynamically based on a level change of the setpoint value current and disposed in said feedback branch of said digital closed loop system.

2. The motor vehicle control unit according to claim 1, wherein the filter time is set longer in a case of a generally constant level or in a case of minor level changes in the setpoint value current for reducing interferences of the electric current caused by the vehicle electrical system voltage ripple than in a case of major level changes of the setpoint value current.

3. The motor vehicle control unit according to claim 1, wherein said adaptive correction filter has at least one first stationary filter and at least one second stationary filter, and that a filter time of said first stationary filter is chosen to be greater than a filter time of said second stationary filter such that said first stationary filter is slower than said second stationary filter.

4. The motor vehicle control unit according to claim 3, wherein said digital closed loop system has a switchover element and a subtracting element for determining a control deviation of said digital closed loop system; and
    further comprising an analysis/control unit for observing level dynamics of the setpoint value current and disposed upstream of said subtracting element, said analysis/control unit activating by means of said switchover element only said first stationary filter with the longer filter time in an event of a smaller level dynamic response of the setpoint value current and only said second stationary filter with the shorter filter time in an event of a greater level dynamic response of the setpoint value current in said feedback branch.

5. The motor vehicle control unit according to claim 4, wherein said first stationary filter with the longer filter time is switched to active in said feedback branch if level changes in the setpoint value current undershoot a predefined threshold, and that said second stationary filter with the shorter filter time is active in said feedback branch if the level changes in the setpoint value current exceed the predefined threshold value.

6. The motor vehicle control unit according to claim 3, wherein said first stationary filter and said second stationary filter are each embodied as a discrete time averager for a measured actual current of said solenoid control valve forming a control variable of said digital closed loop system.

7. The motor vehicle control unit according to claim 3, wherein said first stationary filter and said second stationary filter are each embodied as a low-pass filter.

8. The motor vehicle control unit according to claim 1, wherein:
    said digital closed loop system has a digital controller outputting an actuating signal and a D component of the actuating signal; and
    the filter time of said adaptive correction filter is controllable by means of the D component of the actuating signal of said digital controller.

9. The motor vehicle control unit according to claim 8, wherein said digital controller has a limiter limiting the D component to at least one of a lower threshold and an upper threshold.

10. The motor vehicle control unit according to claim 8, wherein said adaptive correction filter in said feedback branch is embodied such that with an aid of the D component said adaptive correction filter determines a corrected control variable which takes into account at least one actual current value of a current control cycle and in addition at least one actual current value of at least one preceding control cycle all a more heavily, a smaller the D component is.

11. The motor vehicle control unit according to claim 1, wherein the motor vehicle hydraulic device is formed by at least one of at least one clutch and at least one hydraulic brake.

12. The motor vehicle control unit according to claim 8, wherein said digital controller of said digital closed loop system is a PID controller.

13. The motor vehicle control unit according to claim 7, wherein said low-pass filter is selected from the group consisting of a PT1 element and a PT2 element.

14. A method for reducing an effect of a vehicle electrical system voltage ripple on a control of an electric current of a solenoid control valve in a digital closed loop system of a control unit for a motor vehicle hydraulic device with simultaneously improved dynamic behavior in response to setpoint value jumps of a setpoint value current as a reference variable of the closed loop system, which comprises the steps of:
    setting a filter time of at least one adaptive correction filter in a feedback branch of the digital closed loop system dynamically based on a level change of the setpoint value current.

15. The method according to claim 14, which further comprises setting the filter time of at least one filter in the feedback branch of the digital closed loop system dynamically by means of level dynamics of the setpoint value current of a controller of the closed loop system such that the filter time of the filter is chosen to be greater for reducing interferences of the electric current due to the vehicle electrical system voltage ripple in a case of a smaller level dynamic response of the setpoint value current supplied on an input side than in a case of a greater level dynamic response of the setpoint value current, and that in a case of a higher level value dynamic response of the setpoint value current the filter time is chosen to be smaller for a purpose of increasing a speed of correction behavior of the controller than in a case of a smaller level dynamic response of the setpoint value current.

* * * * *